United States Patent
Mansour et al.

(10) Patent No.: US 10,873,958 B1
(45) Date of Patent: Dec. 22, 2020

(54) CONTROLLING PRB ALLOCATION FOR DUAL-CONNECTIVITY SERVICE

(71) Applicant: Sprint Spectrum L.P., Overland Park, KS (US)

(72) Inventors: Nagi Mansour, Arlington, VA (US); Akin Ozozlu, Mclean, VA (US); Noman Alam, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 47 days.

(21) Appl. No.: 16/409,003

(22) Filed: May 10, 2019

(51) Int. Cl.
*H04W 72/04* (2009.01)
*H04W 72/12* (2009.01)
*H04W 76/16* (2018.01)
*H04W 52/24* (2009.01)
*H04W 52/14* (2009.01)

(52) U.S. Cl.
CPC ..... *H04W 72/1215* (2013.01); *H04W 52/146* (2013.01); *H04W 52/243* (2013.01); *H04W 72/1268* (2013.01); *H04W 76/16* (2018.02)

(58) Field of Classification Search
CPC ........... H04W 72/042; H04W 72/0446; H04W 76/14; H04W 52/146; H04W 72/12; H04W 88/06; H04W 72/0406; H04W 24/10; H04W 52/365; H04W 72/0453; H04W 72/1289; H04W 74/0833; H04W 52/367; H04W 72/14; H04W 8/005
See application file for complete search history.

(56) References Cited

U.S. PATENT DOCUMENTS

| | | |
|---|---|---|
| 9,473,286 B1 | 10/2016 | Shipley et al. |
| 2008/0043677 A1 | 2/2008 | Kim et al. |
| 2008/0188184 A1 | 8/2008 | Nogami et al. |
| 2012/0088455 A1 | 4/2012 | Love et al. |
| 2012/0213095 A1 | 8/2012 | Krishnamurthy et al. |
| 2012/0320769 A1 | 12/2012 | Callender |
| 2013/0194938 A1 | 8/2013 | Immonen et al. |
| 2013/0315085 A1 | 11/2013 | Krishnamurthy et al. |
| 2014/0050146 A1 | 2/2014 | Chrisikos et al. |
| 2015/0011236 A1* | 1/2015 | Kazmi ................ G01S 5/0226 455/456.1 |
| 2015/0141068 A1 | 5/2015 | Immonen et al. |
| 2015/0341945 A1 | 11/2015 | Panchal |
| 2018/0338319 A1* | 11/2018 | Kim ...................... H04W 76/14 |
| 2019/0037560 A1* | 1/2019 | Huang ................ H04W 52/325 |
| 2019/0104477 A1* | 4/2019 | MolavianJazi ....... H04L 5/0023 |
| 2019/0150182 A1* | 5/2019 | Koorapaty ........ H04W 74/0808 370/329 |
| 2019/0306801 A1* | 10/2019 | Zhou ..................... H04W 52/04 |

* cited by examiner

*Primary Examiner* — Sai Aung (57) ABSTRACT

A method and system for controlling PRB allocation in dual-connectivity service in which a first access node serves a UE on a first carrier concurrently with a second access node serving the UE on a second carrier. In an example implementation, the first and second access nodes interwork with each other to select a pair of (i) a first group of PRBs within the first carrier for uplink transmission from the UE to the first access node and (ii) a second group of PRBs within the second carrier for uplink transmission from the UE to the second access node, with the selecting being based on minimizing a maximum-power-reduction (MPR) that would be applied for concurrent transmission by the UE to the first access node and to the second access node. The access nodes could then accordingly coordinate the UE's concurrent uplink transmissions.

20 Claims, 4 Drawing Sheets

CONTROLLING PRB ALLOCATION FOR DUAL-CONNECTIVITY SERVICE

BACKGROUND

A cellular wireless network typically includes a number of access nodes (e.g., base stations) that are configured to provide wireless coverage areas in which user equipment devices (UEs) such as cell phones, tablet computers, machine-type-communication devices, tracking devices, embedded wireless modules, and/or other wirelessly equipped communication devices (whether or not user operated) can operate. Each access node could be coupled with a core network that provides connectivity with various application servers and/or transport networks, such as the public switched telephone network (PSTN) and/or the Internet for instance. With this arrangement, a UE within coverage of the cellular network could engage in air interface communication with an access node and could thereby communicate via the access node with various application servers and other entities.

Such a network could operate in accordance with a particular radio access technology (RAT), with communications from the base stations to UEs defining a downlink or forward link and communications from the UEs to the base stations defining an uplink or reverse link.

Over the years, the industry has embraced various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each coverage area could operate on one or more carriers, each of which could be frequency division duplex (FDD), defining separate frequency channels for downlink and uplink communication, or time division duplex (TDD), with a single frequency channel multiplexed over time between downlink and uplink use. Further, on the downlink and uplink, each carrier could be structured to define various physical channels including time-frequency resources for carrying information between the base station and UEs. For example, the air interface could be divided over time into frames, each divided in turn into subframes or transmission time intervals (TTIs) and timeslots, and the carrier bandwidth (frequency width of the carrier on the downlink and/or uplink) could be divided over frequency into subcarriers, which could be grouped within each timeslot to define physical resource blocks (PRBs) in which the subcarriers can be modulated to carry data.

Overview

When a UE enters into coverage of an example network, the UE could detect threshold strong coverage of an access node (e.g., a threshold strong reference signal broadcast by the base station) on a particular carrier and could then engage in random-access and Radio Resource Control (RRC) signaling to establish an RRC connection through which the access node will serve the UE on that carrier.

Further, if the UE is not already registered for service with the core network, the UE could transmit to the access node an attach request, which the access node could forward to a core-network controller for processing. And the core-network controller could then coordinate setup for the UE of one or more bearers extending between the UE and a core-network gateway that provides transport-network connectivity, with the access node establishing corresponding data radio bearers over the air between the access node and the UE.

Once the UE is so connected and registered, the access node could then serve the UE in a connected mode on the carrier, with the access node managing downlink air-interface communication of packet data to the UE and uplink air-interface communication of packet data from the UE.

On the uplink in particular, when the UE has data to transmit on the transport network, the UE could transmit to the access node a scheduling request that provides a buffer status report (BSR) indicating the quantity of data to be transmitted. And the access node could then select a specific frequency range of uplink PRBs in an upcoming TTI on the UE's serving carrier and could transmit to the UE a scheduling-directive that instructs the UE to transmit the data on those PRBs in the upcoming TTI. The UE could accordingly transmit the data to the access node in the indicated PRBs, and the access node could forward the data over the UE's bearer(s) through the core network for output onto the transport network.

In addition, as the industry advances from one generation of wireless technology to the next, networks and UEs may also support simultaneous connectivity on connections according to multiple different RATs.

With the transition from 4G to 5G, for instance, a wireless service provider that operates cell sites with 4G access nodes could upgrade those cell sites to include 5G access nodes as well, and to support an arrangement referred to as EUTRA-NR Dual Connectivity (EN-DC) in which the 4G and 5G access nodes concurrently serve a UE. To facilitate this, a UE could be configured to support both 4G and 5G communication concurrently. For instance, the UE could be equipped with both a 4G modem and associated radio-frequency (RF) circuitry to facilitate being served by a 4G access node and a 5G modem and associated RF circuitry to facilitate being served by a 5G access node.

In a non-limiting example of EN-DC, a UE could initially discover threshold strong coverage of a cell site's 4G access node on a particular 4G carrier and could establish a 4G connection with that access node on that carrier as described above. Further, the 4G access node could then coordinate setup for the UE of a co-existing 5G connection between the UE and the cell site's 5G access node on a 5G carrier.

With these connections set up, the 4G and 5G access nodes could then each serve the UE in the manner discussed above, concurrently on their respective connections with the UE. For instance, when UE has data to transmit on the transport network, the UE could send a scheduling request for a portion of the data to the 4G access node and a scheduling request for another portion of the data to the 5G access node. In response to these scheduling requests, the 4G and 5G access nodes could then schedule concurrent uplink transmission by the UE on their respective connections, with the 4G access node allocating a range of uplink PRBs in an upcoming TTI on the 4G connection and the 5G access node allocating a range of uplink PRBs in the same upcoming TTI on the 5G connection. In that TTI, the UE would thus transmit a portion of its data in the allocated uplink 4G PRBs to the 4G access node while concurrently transmitting another portion of its data in the allocated uplink 5G PRBs to the 5G access node.

Advantageously, dual-connectivity can help to provide a UE with increased peak data rate by multiplexing packet-data onto multiple concurrent connections. Dual-connectivity could thus be desirable for UEs that are or will be engaged in high-throughput communication.

Unfortunately, however, uplink transmission by a UE concurrently in two different ranges of frequency can give rise to third-order intermodulation-distortion (IM3) products or the like that are subject to restrictions as to power spectral density (PSD) (e.g., dBm/MHz). In particular, with EN-DC for instance, the UE's concurrent uplink transmissions in the allocated uplink 4G PRBs and in the allocated uplink 5G PRBs could give rise to a pair of IM3 products having locations in frequency that are subject to PSD restrictions per industry specifications, governmental regulations, or wireless-operator policies.

In general, the location in frequency of each of these IM3 products would be a linear function of the frequencies of the underlying concurrent transmissions. In particular, concurrent transmission at frequencies $F_{U1}$ and $F_{U2}$ would produce one IM3 product at $F_{IM3}=2F_{U2}-F1_{U1}$, and would produce another IM3 product at $F_{IM}=2F_{U1}-F1_{U2}$. Therefore, the Further, the PSD of each of these IM3 products would be a linear function of the PSD of the two underlying transmissions. In particular, if the transmission at $F_{U1}$ has $PSD_{U1}$ and the transmission at $F_{U2}$ has $PSD_{U2}$, then the PSD of one IM3 product is related to the PSDs of the two transmissions as follows:

$$\log(PSD_{IM3}) \propto (2*\log(PSD_{U1})+\log(PSD_{U2})),$$

and the PSD of the other IM3 product is related to the PSDs of the two transmissions as follows:

$$\log(PSD_{IM3}) \propto (2*\log(PSD_{U2})+\log(PSD_{U1})).$$

(These relationships are expressed here with the proportional symbol, as there may be constants or other values involved as well.)

Given this PSD relationship, one way to control the PSD of each IM3 product is to limit the PSDs of the underlying transmissions, by applying power-backoff.

In practice, for instance, on each of the UE's concurrent connections, the UE and its serving access node may normally engage in a power control process in which the access node regularly evaluates uplink receive signal strength from the UE and commands the UE to increase or decrease the UE's transmission power in an effort to keep the uplink receive signal strength at a desired level. And the UE may normally be configured with a maximum output-power setting per connection, defining a cap on the UE's nominal output power in accordance with the UE's power class or other factors. Applying power-backoff in this context could involve reducing the UE's maximum output power per connection. For example, a baseline maximum-power reduction (MPR) could be imposed based on industry specifications or governmental regulations, and an additional maximum-power reduction (A-MPR) could be imposed to help control PSD of IM3 products.

While imposing A-MPR on one or more of the UE's concurrent transmissions may thus help to control PSD of the resulting IM3 products and to thereby help to comply with industry, government, operator, or other restrictions, an unfortunate result of limiting the power of the UE's transmissions can be reduced effective coverage and throughput, which could give rise to user-experience issues and/or other problems.

Disclosed herein is a method and system to help address these issues.

In accordance with the disclosure, when two access nodes concurrently serve a UE in a dual-connectivity scenario, the access nodes will work with each other to select respective ranges of uplink PRBs that will minimize associated A-MPR that will be imposed on the UE. In practice, for instance, when a first access node serving the UE on a first connection is going to schedule communication by the UE on a first frequency-range of uplink PRBs on that first connection, a second access node concurrently serving the UE on a second connection could select a second frequency-range of uplink PRBs on that second connection with the selection being based on a determination that the resulting pair of transmissions would have minimal A-MPR.

More particularly, in an example implantation, the second access node could be provisioned with or otherwise have access to a table that maps various pairs of uplink PRB frequency ranges to associated levels of A-MPR that would be imposed on the UE. Given knowledge that the first access node is going to schedule uplink transmission from the UE on the first frequency-range of PRBs, the second access node could thus determine from the table which second frequency-range of PRBs would, when paired with the first frequency-range of PRBs result in a lowest level of A-MPR. And the second access node could accordingly schedule uplink transmission from the UE on that second frequency-range of PRBs to occur concurrently with the UE's transmission to the first access node on the first frequency-range of PRBs.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of EN-DC service. In particular, the example implementation will be described in the context a network that includes a cell site having a 4G LTE access node (evolved Node-B (eNB)) and a 5G NR access node (next generation Node-B (gNB)). It should be understood, however, that the principles disclosed herein could extend to apply in other scenarios as well, such as with respect to other RATs and other access-node arrangements. Further, variations from the specific arrangements and processes described are possible. For instance, various described entities, connections, functions, and other elements could be added, omitted, distributed, re-located, re-ordered, combined, or changed in other ways.

Figure 1:
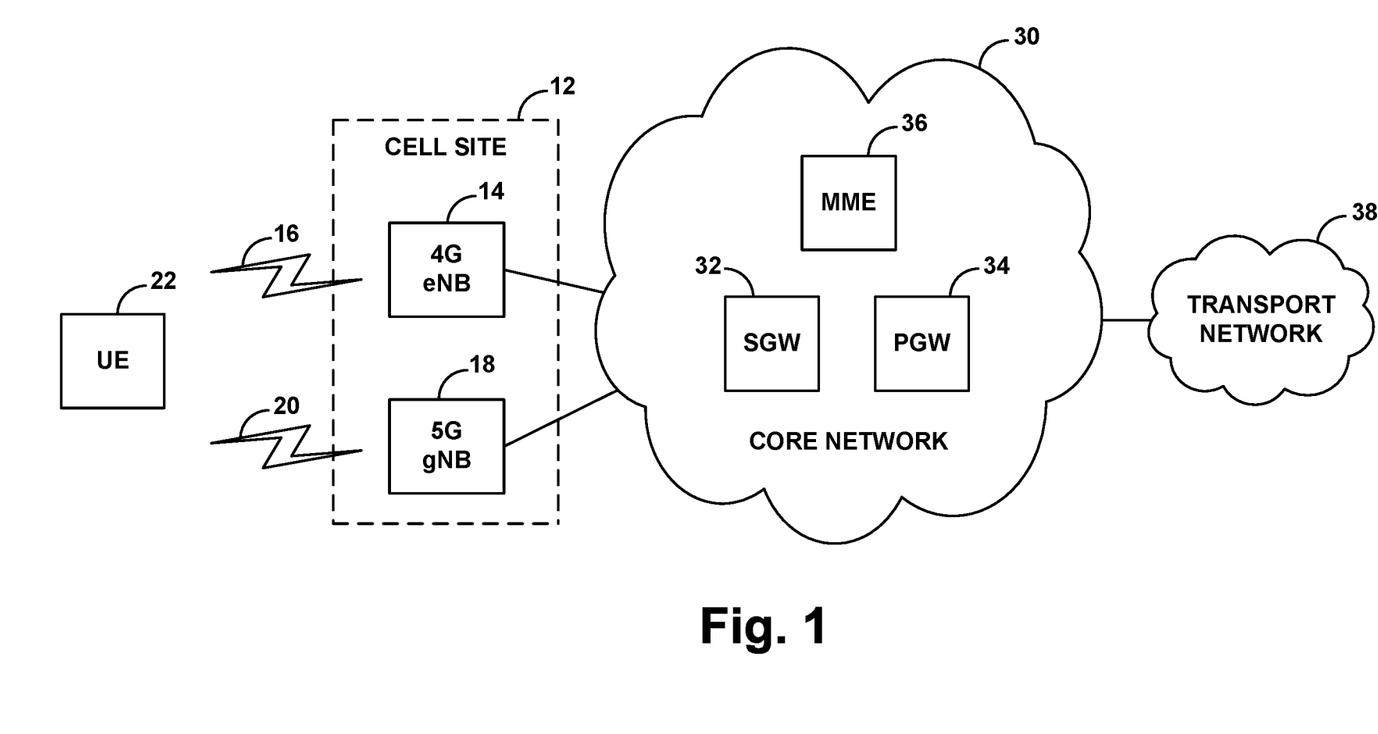
FIG. 1 is a simplified block diagram of an example network arrangement in which features of the present disclosure can be implemented.

FIG. 1 depicts an example cell site 12 that includes a 4G eNB 14 that is configured to provide 4G service on one or more 4G carriers 16, and a 5G gNB 18 that is configured to provide 5G service one or more 5G carriers 20. These access nodes could be collocated with each other at the cell site (e.g., sharing a common antenna tower and other equipment) and could provide coverage in largely the same direction as each other, to define overlapping coverage in which UEs can receive both 4G service from the 4G eNB 14 and 5G service from the 5G gNB 18.

In representative 4G and 5G implementations, each carrier could be FDD or TDD and could thus define separate downlink and uplink frequency channels or a single frequency channel multiplexed over time between downlink and uplink use. In any event, each frequency channel of a carrier could be characterized by a defined frequency bandwidth (width in radio-frequency (RF) spectrum) and center frequency and may have a unique carrier identifier.

The air interface provided by a given 4G or 5G carrier could be structured as described above, being divided over time into frames, subframes (TTIs), timeslots, and symbol time segments, and over frequency into subcarriers, thus defining an array of air-interface resource elements in which subcarriers can be modulated to carry data. And in each TTI, timeslot, or the like, the resource elements could then be divided into groups defining the PRBs, which the access node could allocate for use to carry data to or from served UEs.

Further, 4G service and 5G service could differ from each other in various ways now known or later developed, such as with one implementing variable subcarrier spacing and the other having fixed subcarrier spacing, with one having flexible TDD configuration and the other having fixed TDD configuration, with one having different symbol time segments than the other, and/or with one making different use of MIMO technologies than the other, among other possibilities.

As further shown, the example 4G eNB and 5G gNB are each connected with a common core network 30, which could be an Evolved Packet Core (EPC) network or Next Generation Core (NGC) network for instance. In the example shown, the core network includes a serving gateway (SGW) 32, a packet data network gateway (PGW) 34, and a mobility management entity (MME) 36. In this arrangement, the 4G eNB and 5G gNB might each have an interface with the SGW, the SGW might have an interface with the PGW, and the PGW might provide connectivity with a transport network 38. In addition, at least the 4G eNB might have an interface with the MME, and the MME might have an interface with the SGW, so that the MME could coordinate setup of bearer connections for UEs to enable the UEs to engage in packet-data communication via 4G and 5G. Further, the 4G eNB and 5G gNB may have an inter-access-node interface enabling them to engage in signaling with each other.

FIG. 1 depicts an example UE 22 within coverage of the 4G eNB and 5G gNB. This UE could be configured to support EN-DC service. For instance, the UE could be equipped with a 4G radio and associated components to establish a 4G connection with the 4G eNB and to engage in 4G service over that connection, a 5G radio and associated components to establish a 5G connection with a 5G gNB and to engage in 5G service over that connection, and associated logic to support engaging in EN-DC service.

Further, the 4G eNB and 5G gNB may be configured to support providing EN-DC service for UEs such as UE 22, with the 4G eNB operating as a master node (MN) and control-signaling anchor for the EN-DC service, and the 5G gNB operating as a secondary node (SN) for the EN-DC service.

When UE 22 initially enters into coverage of the example cell site, the UE could scan for and detect coverage of the 4G eNB on a particular 4G carrier and the UE could engage in random-access signaling and RRC connection signaling with the 4G eNB as discussed above to establish a 4G RRC connection over which to be served by the 4G eNB on that carrier. In addition, if appropriate, the UE could then engage in attach signaling with the MME via the UE's 4G connection. And the MME and 4G eNB could coordinate setup for the UE of a data bearer including an access-bearer portion extending between the 4G eNB and the SGW/PGW and a radio-bearer portion extending over the air between the 4G eNB and the UE.

Further, the 4G eNB could coordinate setup of EN-DC service for the UE. To do so, in an example implementation, the 4G eNB could direct the UE to scan for coverage on the one or more carriers 20 of the 5G gNB, and the UE could responsively report to the 4G eNB that the UE detects threshold strong coverage of the 5G gNB on a particular 5G carrier. Given this, the 4G eNB could then engage in signaling with the UE and with the 5G gNB to arrange for setup of a 5G RRC connection between the 5G gNB and the UE on that 5G carrier.

In addition, as part of setting up EN-DC service, the 4G eNB could further coordinate or trigger setup for the UE of a split bearer, so that the UE's packet-data communication can then be multiplexed between the UE's 4G connection and the UE's 5G connection. For instance, a bearer split could be defined at the SGW, establishing separate access-bearer legs extending respectively between the SGW and the 4G eNB and between the SGW and the 5G gNB. Alternatively, a bearer split could be defined at the 4G eNB, through the interface between the 4G eNB and the 5G gNB. Or still alternatively, the UE's access bearer could be transferred from the 4G eNB to the 5G gNB, and a bearer split could be defined at the 5G gNB, likewise through the interface between the 5G gNB and the 4G eNB.

With EN-DC service so set up, the 4G eNB and 5G gNB could then proceed to serve the UE concurrently, including scheduling concurrent uplink communication on the UE's 4G and 5G connections as discussed above.

In practice, for instance, each time the UE has data to transmit, the UE could send a scheduling request including a BSR for one portion of the data to the 4G eNB, and the UE could send a scheduling request including a BSR for another portion of the data to the 5G gNB. In response to the UE's 4G scheduling request, the 4G eNB could select a frequency-range of one or more uplink PRBs in an upcoming TTI on the 4G connection for the UE's 4G transmission and could transmit to the UE a scheduling directive designating the allocated 4G PRBs in the upcoming TTI, and the UE could engage in that 4G transmission in the designated 4G PRBs of the upcoming TTI. And in response to the UE's 5G scheduling request, the 5G gNB could select a frequency-range of one or more uplink PRBs in an upcoming TTI on the 5G connection for the UE's 5G transmission and could transmit to the UE a scheduling directive designating the allocated 5G PRBs in the upcoming TTI, and the UE could engage in that 5G transmission tin the designated 5G PRBs of the upcoming TTI.

As the 4G eNB and 5G gNB schedule various such 4G and 5G uplink transmissions from the UE, a given 4G transmission on the UE's 4G connection may occur in the same TTI as a given 5G transmission on the UE's 5G connection. And this concurrent communication on different frequency ranges (here, on a frequency-range of 4G PRBs and a frequency range of 5G PRBs) could give rise to the IM3 problem noted above, including the possible need for the UE to impose A-MPR to help keep the PSD of the IM3 products to an acceptable level.

As discussed above, in such a scenario, the 4G eNB and 5G gNB could work with each other on a per TTI basis to select a pair of such PRB frequency-ranges that may minimize the applicable A-MPR.

To facilitate this in an example implementation, the cell site 12 could be provisioned with PRB-pairing to A-MPR correlation data 24. This correlation data could comprise a table or other data structure that lists various pairs of 4G PRB frequency-range and 5G PRB frequency-range (4G-5G PRB pair) and that specifies for each 4G-5G PRB pair at least one corresponding A-MPR that a UE should apply in a TTI in which the UE engages in transmission concurrently on that 4G-5G PRB pair.

In an example implementation, this correlation data could list various 4G-5G PRB pairs, including various 4G PRB frequencies and quantities of 4G PRBs, paired with various 5G PRBs and quantities of 5G PRBs. Further, in an example implementation, the correlation data could map each 4G-5G PRB pair with a single respective A-MPR that the UE should apply both to the UE's 4G transmission and to the UE's 5G transmission. And in another implementation, the correlation data could map each 4G-5G PRB pair with two A-MPR values, one that the UE should apply to its 4G transmission and another that the UE should apply to its 5G transmission.

This correlation data could be established by engineering input in advance, based on various A-MPR regulations, specifications, policies or the like. For instance, the engineering input could take into consideration industry or governmentally imposed spectral emission masks (SEMs) and/or other PSD restrictions that define varying levels of A-MPR depending on where in frequency IM3 products fall in relation to the operating bandwidth of the serving carrier or the like, and could take into consideration various other factors. Alternatively, the correlation data could be established dynamically or on another basis.

In an example implementation, the correlation data could be stored at or otherwise accessible by one of the cell site's access nodes, for use by that access node as a basis to select an uplink PRB frequency range to allocate to the UE for use in a given TTI, with the selection being based on information indicating which uplink PRB frequency range the other access node of the cell site is or will be allocating to the UE for use in the same TTI.

For instance, the correlation data could be stored at or otherwise accessible to the 4G eNB, for use by the 4G eNB as a basis to select an uplink 4G PRB frequency range to allocate to the UE for transmission in a given TTI, with the selection based on information indicating which uplink 5G PRB frequency range the 5G gNB is or will be allocating to the UE for transmission in the same TTI. Or the correlation data could be stored at or otherwise accessible to the 5G gNB, for use by the 5G gNB as a basis to select an uplink 5G PRB frequency range to allocate to the UE for transmission in a given TTI, with the selection based on information indicating which uplink 4G PRB frequency range the 4G eNB is or will be allocating to the UE for use in the same TTI.

In an example implementation where the 4G eNB refers to the correlation data, the 5G gNB could inform the 4G eNB when the 5G gNB has selected an uplink 5G PRB frequency range to allocate to the UE for an upcoming TTI, optimally before the 5G gNB transmits to the UE a scheduling directive to schedule that upcoming 5G transmission. For instance, the 5G gNB could transmit to the 4G eNB a signaling message that specifies the 5G PRB frequency range (e.g., particular 5G PRBs, by frequency and quantity) and the TTI.

Given this information, as the 4G eNB is seeking to select an uplink 4G PRB frequency range to allocate to the UE, the 4G eNB could refer to the correlation data 24 to determine which uplink 4G PRB frequency range, when used by the UE concurrently with the uplink 5G PRB frequency range (i.e., in the same TTI), will result in imposition of the lowest A-MPR. Here, for instance, the 4G eNB might query the correlation data to identify all 4G-5G PRB pairs that include the uplink 5G PRB frequency range at issue and to determine, of the identified 4G-5G pairs, which has the lowest associated A-MPR. In this process, the 4G eNB may thus compare the A-MPR values that the correlation data specifies respectively for each 4G-5G PRB pair including the uplink 5G PRB frequency range at issue, to find the lowest. And if a tie exists, the 4G eNB might select one based on one or more additional factors.

An example implementation of this process assumes that the 4G eNB has already decided how many uplink 4G PRBs it is going to allocate for use by the UE. Thus, at issue could be which pairing of that quantity of uplink 4G PRBs with the uplink 5G PRB frequency range would have the lowest associated A-MPR.

Further, this process could vary depending on the configuration of the correlation data. For instance, if the correlation data specifies just a single A-MPR value for each 4G-5G PRB pair, then the 4G eNB could determine which of the 4G-5G PRB pairs that includes the uplink 5G PRB frequency range and the desired quantity of 4G PRBs (i.e., which candidate pair) would have the lowest such A-MPR value. Alternatively, if the correlation data specifies for each 4G-5G PRB pair both a 4G A-MPR value and a 5G A-MPR value, the 4G eNB might determine which candidate pair has the lowest 4G A-MPR, which candidate pair has the lowest 5G A-MPR, which candidate pair has the lowest of either A-MPR, or which candidate pair has the lowest average of those two A-MPR values, among various other possibilities.

In any event, upon determining the optimal 4G-5G PRB pair through this process or a variation of this process, the 4G eNB could then allocate to the UE the uplink 4G PRB frequency range of the determined pair.

As the 4G eNB and 5G gNB would then both schedule uplink transmission from the UE to occur in this same upcoming TTI, both access nodes may transmit their respective scheduling directives to the UE at an appropriate advanced time point (perhaps depending on carrier type and/or frame configuration) in order to each schedule the UE's transmission to occur in the upcoming TTI. In particular, the 4G eNB could transmit to the UE an advanced 4G scheduling directive that will cause the UE to transmit in the uplink 4G PRB frequency range in the upcoming TTI, and the 5G gNB could transmit to the UE an advanced 5G scheduling directive that will cause the UE to transmit in the uplink 5G PRB frequency range in the upcoming TTI.

Optimally, causing the UE to engage in concurrent uplink transmission in the selected 4G-5G PRB pair having a relatively low A-MPR rather than in a 4G-5G PRB pair that has a relatively high A-MPR may help to minimize coverage and throughput issues arising from application of A-MPR. As such, the process may help to improve dual-connectivity service.

Note also that, in a further implementation, the above process could be extended to also take into consideration possible carrier-aggregation service on at least one of the UE's co-existing connections. For instance, in a scenario where the 4G eNB serves the UE concurrently on multiple 4G carriers while the 5G gNB serves the UE on at least one 5G carrier, the above process could be extended to involve selecting an uplink 4G PRB frequency range to allocate for the UE from among the multiple 4G carriers, for use by the UE in the same TTI as the UE will be transmitting on a given 5G PRB frequency range.

With carrier-aggregation on a given connection (e.g., on a 4G connection), the serving access node designates one of multiple carriers as the UE's primary component carrier (PCC) and each of one or more other carriers as a secondary component carrier (SCC). In an example carrier-aggregation implementation, all of the carriers on which the access node serves the UE could be used for scheduled downlink communications to the UE, but just the PCC could be used for scheduled uplink communications from the UE.

Given this, when the 4G eNB learns what uplink 5G PRB frequency range the 5G gNB is going to allocate for use by the UE in an upcoming TTI, the 4G eNB might determine from the correlation data which uplink 4G PRB frequency range selected from among the UE's multiple serving 4G carriers would pair with that uplink 5G PRB frequency range to map to the lowest A-MPR. And the if that 4G PRB frequency range is not in the UE's PCC but is rather in one of the UE's one or more SCCs, then the 4G eNB could engage in RRC signaling with the UE to reconfigure the UE's carrier-aggregation service so as to change that SCC to be the UE's PCC (and to correspondingly change the UE's PCC to be an SCC) so that the 4G eNB could then schedule uplink communication from the UE on that 4G PRB frequency range as discussed above.

Alternatively, when the 4G eNB sets up EN-DC service for the UE, the 4G eNB could correspondingly configure or reconfigure carrier-aggregation service for the UE so as to have the carrier that will be the UE's PCC be a carrier whose uplink 4G PRBs, when paired with various uplink 5G PRB frequency ranges in the UE's serving 5G carrier, will result in the lowest likely A-MPR. Here likewise, the 4G eNB could use the correlation data noted above as a basis to make this determination.

Figure 2:
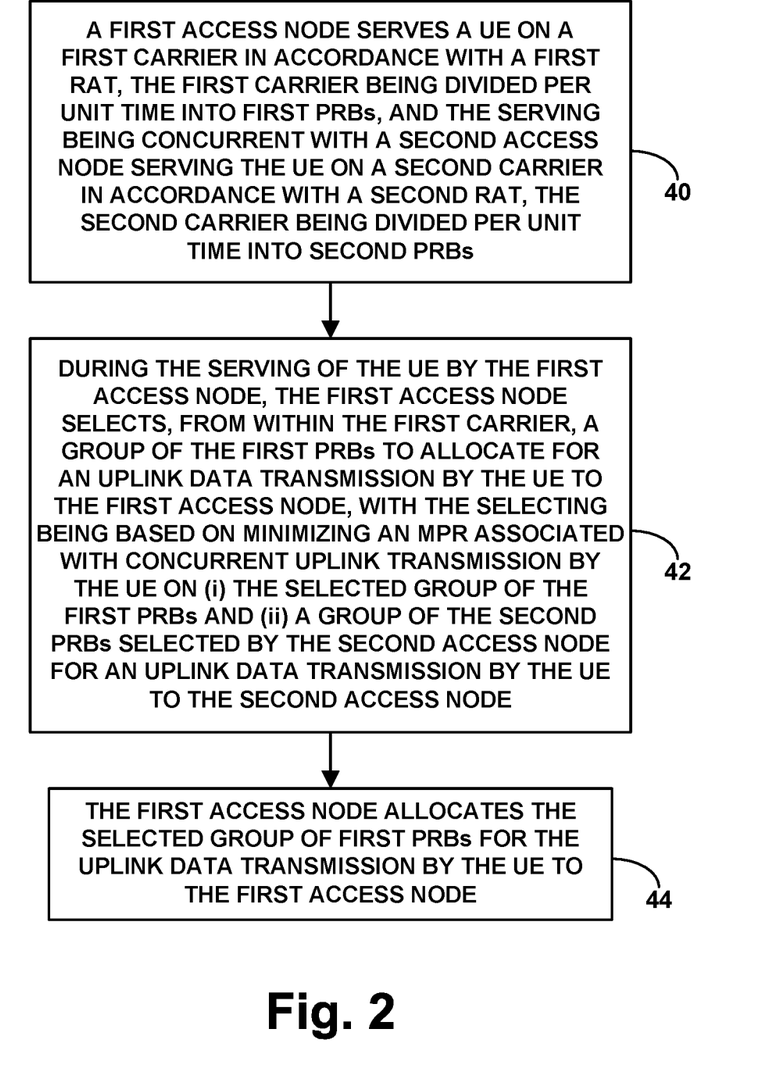
FIG. 2 is a flow chart depicting an example method in accordance with the present disclosure.

FIG. 2 is next a flow chart depicting a method for controlling PRB allocation in dual-connectivity service.

As shown in FIG. 2, at block 40, the method includes a first access node serving a UE on a first carrier in accordance with a first RAT, the first carrier being divided per unit time into first PRBs, and the serving being concurrent with a second access node serving the UE on a second carrier in accordance with a second RAT, the second carrier being divided per unit time into second PRBs. Further, at block 42, the method includes, during the serving of the UE by the first access node, the first access node selecting, from within the first carrier, a group of the first PRBs to allocate for an uplink data transmission by the UE to the first access node, with the selecting being based on minimizing an MPR associated with concurrent uplink transmission by the UE on (i) the selected group of the first PRBs and (ii) a group of the second PRBs selected by the second access node for an uplink data transmission by the UE to the second access node. And at block 44, the method includes the first access node allocating the selected group of first PRBs for the uplink data transmission by the UE to the first access node.

In line with the discussion above, this method could be carried out when the first access node and second access node are cooperatively serving the UE with EN-DC service. And in that context for instance, the first RAT could be 4G LTE or 5G NR, and the second RAT could be the other of 4G LTE and 5G NR. Thus, the first access node in the method could be a 4G eNB, which could work to select uplink 4G PRBs to allocate to the UE based on the MPR that would be associated with the UE concurrently transmitting on those allocated 4G PRBs and 5G PRBs allocated by a 5G gNB. Or the first access node could be a 5G gNB, which could work to select uplink 5G PRBs to allocate to the UE based on the MPR that would be associated with the UE concurrently transmitting on those 5G PRBs and 4G PRBs allocated by a 4G eNB.

Further, in the method, the act of selecting the group of first PRBs could involve interaction between the access nodes and reference to correlation data as discussed above. For instance, the first access node could receive from the second access node (through autonomous reporting or in response to a query from the first access node), information indicating the group of second PRBs selected by the second access node for the uplink data transmission by the UE to the second access node. The first access node could then determine, by reference to correlation data that maps (i) each of various pairs of first-PRB frequency range and second-PRB frequency range with (ii) a respective MPR that should be applied for concurrent uplink transmission on the pair, which group of the first PRBs, when paired with the second group of PRBs, would have a lowest respective MPR. And the first access node could then select the determined group of first PRBs to allocate for the uplink data transmission by the UE to the first access node.

Here, by way of example, the determining of the group of first PRBs could involve (a) querying the correlation data to identify a plurality of candidate pairs each including the group of second PRBs selected by the second access node for the uplink transmission by the UE to the second access node, the correlation data specifying for each candidate pair a respective MPR, and (b) determining which of the identified candidate pairs has the lowest respective MPR among the identified candidate pairs.

Further, the MPR at issue in this process could be any MPR. For instance, the MPR could be a baseline MPR, or the MPR could be an A-MPR that would be applied on top of any baseline MPR. And the MPR could be based on third order intermodulation distortion that would be expected to result from the concurrent uplink transmission.

As additionally discussed above, the act of the first access node allocating the selected group of first PRBs for the uplink data transmission by the UE to the first access node could involve the first access node transmitting to the UE a scheduling directive that directs the UE to engage in the uplink data transmission to the first access node in the selected group of first PRBs, to cause the UE to engage in the transmission accordingly.

Further, as discussed above, the first access node might serve the UE on multiple carriers, with carrier-aggregation service. And in that case, one of the multiple carriers (e.g., a PCC) might be the first carrier from within which the first access node selects the group of first PRBs. Or considering the multiple carriers together, the act of selecting of the group of first PRBs could involve selecting the group of first PRBs from within the plurality of first carriers.

And still further, the method could include the first access node selecting a carrier, from among the multiple carriers, to be the first carrier on which the UE will transmit to the first access node, with the selecting of that carrier also being based on minimizing the MPR. For instance, with EN-DC, it may be the case that the UE transmitting on the 4G carrier closest in frequency to a 5G carrier on which the UE concurrently transmits may result in imposition of minimal A-MPR compared with the A-MPR that would be imposed if the UE transmits on a 4G carrier farther away in frequency from the 5G carrier on which the UE concurrently transmits. Therefore, the UE's serving 4G eNB might select that closest 4G carrier to be the UE's PCC, as the 4G carrier that will carry the UE's uplink 4G communication.

Figure 3:
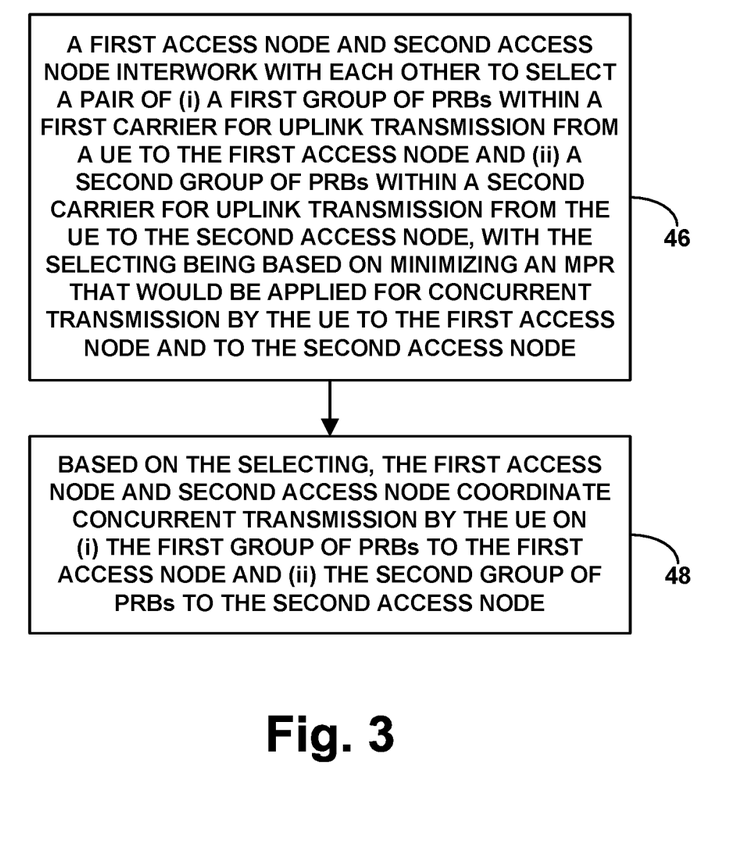
FIG. 3 is another flow chart depicting an example method in accordance with the present disclosure.

FIG. 3 is next a flow chart depicting a method that method for controlling PRB allocation in dual-connectivity service in which a first access node serves a UE on a first carrier concurrently with a second access node serving the UE on a second carrier. As above, this method could be implemented in the context of EN-DC service, among other possibilities.

As shown in FIG. 3, at block 46, the method includes the first access node and second access node interworking with each other to select a pair of (i) a first group of PRBs within the first carrier for uplink transmission from the UE to the first access node and (ii) a second group of PRBs within the second carrier for uplink transmission from the UE to the second access node, with the selecting being based on minimizing an MPR that would be applied for concurrent transmission by the UE to the first access node and to the second access node. And at block 48, the method includes, based on the selecting, the first access node and second access node coordinating concurrent transmission by the UE on (i) the first group of PRBs to the first access node and (ii) the second group of PRBs to the second access node.

In this process, the interworking to select the pair could involve the access nodes exchanging information regarding selected PRBs. For instance, the interworking to select the pair could involve the second access node transmitting to the first access node an indication of the second group of PRBs having been selected by the second access node for use by the UE. Further, the interworking to select the pair could involve determining, by reference to correlation data that that maps (i) each of various pairs of PRBs within the carrier and PRBs within the second carrier with (ii) a respective MPR that should be applied for concurrent uplink transmission on the pair, which pair would have a lowest respective MPR, and selecting the determined pair.

Various features discussed above can be applied in this context, and vice versa. For example, here too, the MPR could take various forms, such as an A-MPR beyond a baseline MPR, and the MPR could be based on third order intermodulation distortion resulting from the concurrent transmission.

Figure 4:
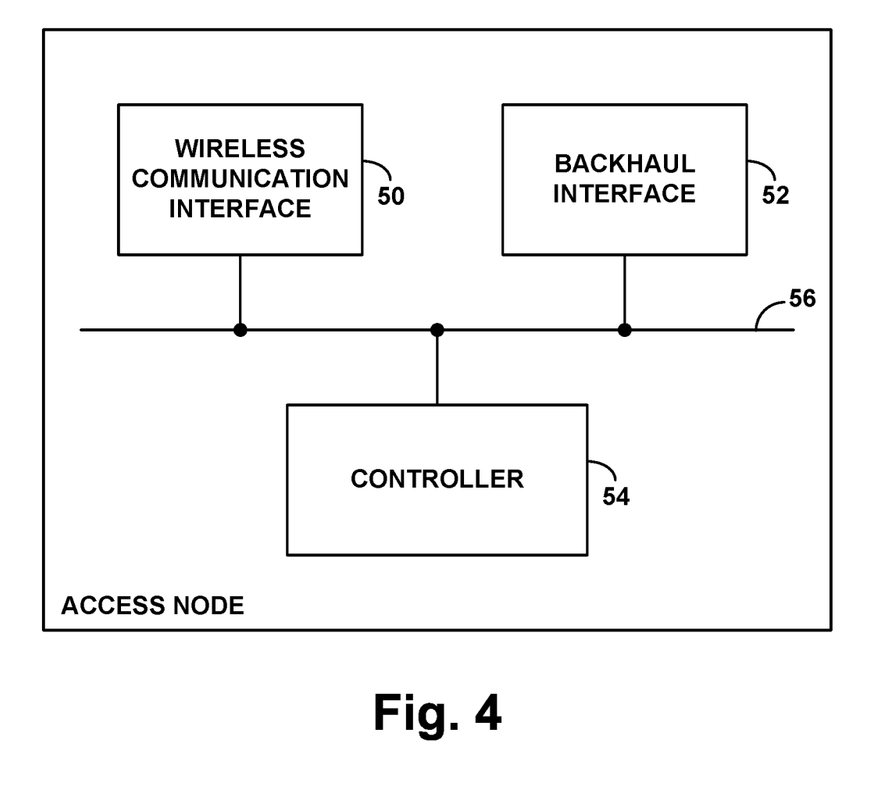
FIG. 4 is a simplified block diagram of an example access node operable in accordance with the present disclosure.

FIG. 4 is next a simplified block diagram depicting an example of first access node that could operate in accordance with the present disclosure within a wireless communication system that includes the first access node and the second access node. This first access node could be configured to provide service on a first carrier that defines a plurality of first PRBs per unit time, and the second access node could be configured to provide service on a second carrier that defines a plurality of second PRBs per unit time.

As shown in FIG. 4, the example first access node includes a wireless communication interface 50, a backhaul interface 52, and a controller 54, all of which may be communicatively linked together by a system bus, network, or other connection mechanism 54.

The wireless communication interface 50 could comprise a modem and associated RF circuitry including an antenna structure through which the first access node is configured to engage in communication on the first carrier. And the backhaul interface 52 could comprise a wired or wireless interface, such as an Ethernet network communication interface or other interface, through which the first access node is configured to engage in network communication with other entities, including for instance the second access node.

Further, controller 52 could comprise a processing unit (e.g., one or more general purpose processors and/or specialized processors) programmed to cause the first access node to carry out various operations such as those discussed above. For instance, the controller could comprise non-transitory data storage (e.g., one or more magnetic, optical, or flash storage components) holding program instructions executable by the processing unit to cause the first access node to carry out such operations.

Various operations discussed above can be carried out in this context as well, and vice versa.

Exemplary embodiments have been described above. Those skilled in the art will understand, however, that changes and modifications may be made to these embodiments without departing from the true scope and spirit of the invention.

We claim:

1. A method for controlling physical-resource-block (PRB) allocation in dual-connectivity service, the method comprising:
    serving, by a first access node a user equipment device (UE) on a first carrier in accordance with a first radio access technology (RAT), the first carrier being divided per unit time into first PRBs, wherein the serving is concurrent with a second access node serving the UE on a second carrier in accordance with a second RAT, the second carrier being divided per unit time into second PRBs;
    during the serving of the UE by the first access node, selecting by the first access node, from within the first carrier, a group of the first PRBs to allocate for an uplink data transmission by the UE to the first access node, wherein the selecting is based on minimizing a maximum power reduction (MPR) associated with concurrent uplink transmission by the UE on (i) the selected group of the first PRBs and (ii) a group of the second PRBs selected by the second access node for an uplink data transmission by the UE to the second access node; and
    allocating by the first access node the selected group of first PRBs for the uplink data transmission by the UE to the first access node.

2. The method of claim 1, wherein the first RAT is one of 4G LTE or 5G NR, and wherein the second RAT is the other of 4G LTE and 5G NR.

3. The method of claim 1, carried out while the first access node and second access node serve the UE with EUTRA-NR Dual Connectivity (EN-DC) service.

4. The method of claim 1, wherein the selecting comprises:
    receiving by the first access node, from the second access node, information indicating the group of second PRBs selected by the second access node for the uplink data transmission by the UE to the second access node;
    determining by the first access node, by reference to correlation data that maps (i) each of various pairs of first-PRB frequency range and second-PRB frequency range with (ii) a respective MPR that should be applied for concurrent uplink transmission on the pair, which group of the first PRBs, when paired with the second group of PRBs, would have a lowest respective MPR; and selecting by the first access node the determined group of first PRBs to allocate for the uplink data transmission by the UE to the first access node.

5. The method of claim 4, wherein the determining comprises:

querying the correlation data to identify a plurality of candidate pairs each including the group of second PRBs selected by the second access node for the uplink transmission by the UE to the second access node, wherein the correlation data specifies for each candidate pair a respective MPR;

determining which of the identified candidate pairs has the lowest respective MPR among the identified candidate pairs.

6. The method of claim 1, wherein the MPR is an additional MPR (A-MPR) beyond a baseline MPR.

7. The method of claim 1, wherein the MPR is based on third order intermodulation distortion resulting from the concurrent uplink transmission.

8. The method of claim 1, wherein allocating by the first access node the selected group of first PRBs for the uplink data transmission by the UE to the first access node comprises transmitting by the first access node to the UE a scheduling directive that directs the UE to engage in the uplink data transmission to the first access node in the selected group of first PRBs.

9. The method of claim 1, wherein the first access node serves the UE on a plurality of carriers, and wherein the selecting of the group of first PRBs comprises selecting the group of first PRBs from within the plurality of first carriers.

10. The method of claim 9, further comprising selecting by the first access node one of the carriers of the plurality to be the first carrier, wherein selecting the carrier to be the first carrier is further based on minimizing the MPR.

11. A method for controlling physical-resource-block (PRB) allocation in dual-connectivity service in which a first access node serves a user equipment device (UE) on a first carrier concurrently with a second access node serving the UE on a second carrier, the method comprising:

the first access node and second access node interworking with each other to select a pair of (i) a first group of PRBs within the first carrier for uplink transmission from the UE to the first access node and (ii) a second group of PRBs within the second carrier for uplink transmission from the UE to the second access node, wherein the selecting is based on minimizing a maximum-power-reduction (MPR) that would be applied for concurrent transmission by the UE to the first access node and to the second access node; and based on the selecting, the first access node and second access node coordinating concurrent transmission by the UE on (i) the first group of PRBs to the first access node and (ii) the second group of PRBs to the second access node.

12. The method of claim 11, carried out while the first access node and second access node serve the UE with EUTRA-NR Dual Connectivity (EN-DC) service.

13. The method of claim 11, wherein the interworking to select the pair comprises:

exchanging information regarding selected PRBs; and determining, by reference to correlation data that that maps (i) each of various pairs of PRBs within the carrier and PRBs within the second carrier with (ii) a respective MPR that should be applied for concurrent uplink transmission on the pair, which pair would have a lowest respective MPR; and selecting the determined pair.

14. The method of claim 11, wherein the MPR is an additional MPR (A-MPR) beyond a baseline MPR.

15. The method of claim 11, wherein the MPR is based on third order intermodulation distortion resulting from the concurrent transmission.

16. In a wireless communication system that includes a first access node configured to provide service on a first carrier defining a plurality of first physical resource blocks (PRBs) per unit time and a second access node configured to provide service on a second carrier defining a plurality of second PRBs per unit time, the first access node comprising:

a wireless communication interface including an antenna structure through which the first access node is configured to engage in communication on the first carrier;

a backhaul interface through which the first access node is configured to engage in communication with the second access node; and a controller having a processing unit programmed to carry out operations including:

(a) serving a user equipment device (UE) on the first carrier in accordance with a first radio access technology (RAT) concurrently with the UE being served by second access node on the second carrier in accordance with a second RAT, (b) while serving of the UE on the first carrier, selecting, from within the first carrier, a group of the first PRBs to allocate for an uplink data transmission by the UE to the first access node, wherein the selecting is based on minimizing a maximum power reduction (MPR) associated with concurrent uplink transmission by the UE on (i) the selected group of the first PRBs and (ii) a group of the second PRBs selected by the second access node for an uplink data transmission by the UE to the second access node, and (c) allocating the selected group of first PRBs for the uplink data transmission by the UE to the first access node.

17. The first access node of claim 16, wherein the selecting comprises:

receiving, from the second access node, information indicating the group of second PRBs selected by the second access node for the uplink data transmission by the UE to the second access node;

determining, by reference to correlation data that maps (i) each of various pairs of first-PRB frequency range and second-PRB frequency range with (ii) a respective MPR that should be applied for concurrent uplink transmission on the pair, which group of the first PRBs, when paired with the second group of PRBs, would have a lowest respective MPR; and selecting the determined group of first PRBs to allocate for the uplink data transmission by the UE to the first access node.

18. The first access node of claim 17, wherein the determining comprises:

querying the correlation data to identify a plurality of candidate pairs each including the group of second PRBs selected by the second access node for the uplink transmission by the UE to the second access node, wherein the correlation data specifies for each candidate pair a respective MPR;

determining which of the identified candidate pairs has the lowest respective MPR among the identified candidate pairs.

19. The first access node of claim 16, wherein the MPR is an additional MPR (A-MPR) beyond a baseline MPR.

20. The first access node of claim 16, wherein the MPR is based on third order intermodulation distortion resulting from the concurrent uplink transmission.

* * * * *